United States Patent [19]
Wunderlich et al.

[11] Patent Number: 5,426,699
[45] Date of Patent: Jun. 20, 1995

[54] METHOD AND APPARATUS FOR DIGITIZING A SCRAMBLED ANALOG VIDEO SIGNAL

[75] Inventors: Richard E. Wunderlich, Alpharetta; James O. Farmer, Lilburn, both of Ga.

[73] Assignee: ANTEC Corporation, Rolling Meadows, Ill.

[21] Appl. No.: 142,586

[22] Filed: Oct. 25, 1993

[51] Int. Cl.6 ............................................. H04K 1/00
[52] U.S. Cl. ......................................... 380/20; 380/10
[58] Field of Search ................... 380/5, 10, 19, 20, 21, 380/49, 50; 348/572, 416; H04K 7/20, 7/200, 7/80

[56] References Cited

U.S. PATENT DOCUMENTS

| | | | |
|---|---|---|---|
| 4,802,213 | 1/1989 | Citta et al. | 380/7 |
| 4,956,862 | 9/1990 | Robbins et al. | 380/19 |
| 5,175,618 | 12/1992 | Ueda et al. | 348/416 |
| 5,267,312 | 11/1993 | Thompson et al. | 380/19 |
| 5,285,497 | 2/1994 | Thatcher, Jr. | 380/49 X |

FOREIGN PATENT DOCUMENTS 092015175 9/1992 WIPO ............................ H04N 7/20

Primary Examiner—Tod R. Swann
Attorney, Agent, or Firm—William A. Marvin

[57] ABSTRACT

An on demand services feature for the provision of video, audio, and data services for a subscription system of the CTV type, or the like. The system comprises a headend coupled to a distribution network having a multiplicity of subscribers. Standard service signals forming scheduled program channels are coupled commonly with on demand service signals forming on demand program channels in a frequency division multiplexed system. The demand services are provided by a demand service processor having an input processor which stores programs for the demand services in a file server or other massive memory and a plurality of output processors which retrieve the programs on demand and convert them to the demand service signals for application to the distribution network. In the illustrated embodiment the input processor scrambles, digitizes and compresses real time or other stored analog programming for storage in the file server. On demand from a subscriber, an output processor reads out a stored program from the file server as a digital data stream, decompresses it and converts it back to an analog scrambled signal. The analog scrambled signal is then modulated on a carrier by the output processor to become an on demand services signal.

32 Claims, 11 Drawing Sheets

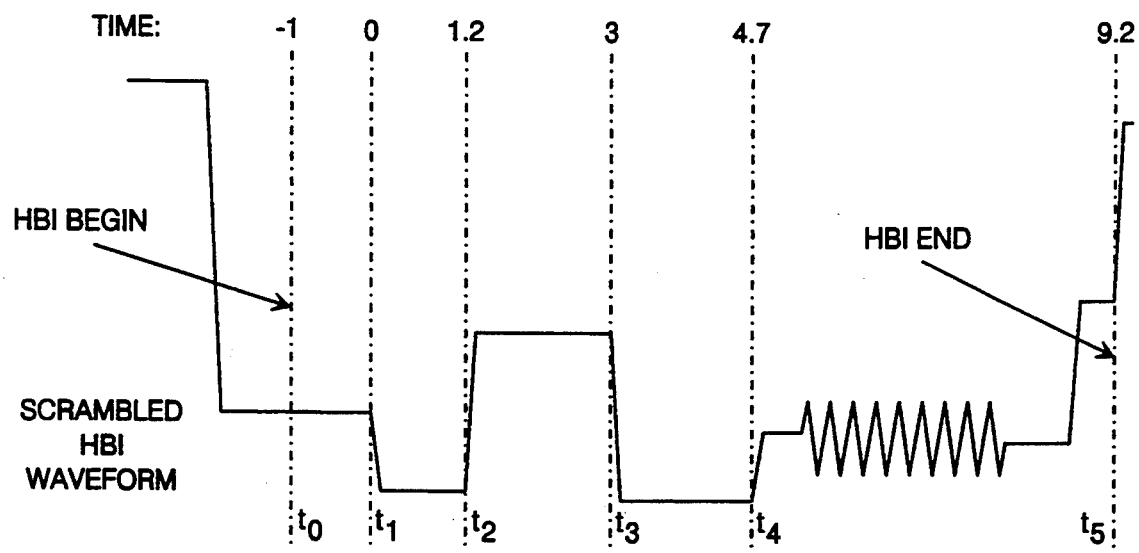
FIG. 8
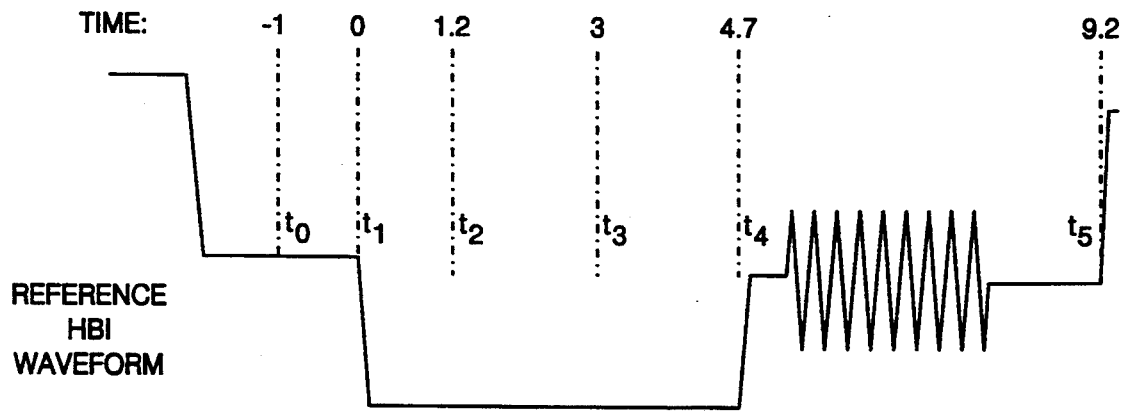
FIG. 9
FIG. 10
DESCRIPTION HBI
| | TIME | LEVEL | |
|---|---|---|---|
| $T_0$ | -1μsec | 180 | NOMINAL BEGIN HBI |
| $T_1$ | 0 | 160 | START SYNCH |
| $T_2$ | 1.2 | 205 | START SPLIT |
| $T_3$ | 3 | 160 | END SPLIT |
| $T_4$ | 4.7 | 180 | END SYNCH |
| $T_5$ | 9.2 | 230 | END HBI |

METHOD AND APPARATUS FOR DIGITIZING A SCRAMBLED ANALOG VIDEO SIGNAL

FIELD OF THE INVENTION

The invention relates generally to subscriber systems, such as cable television (CTV) systems, for the delivery of video, audio, and data services and, more particularly, to a method and an apparatus for providing on demand services in such systems.

BACKGROUND OF THE INVENTION

Subscriber systems, such as cable television systems, have been configured to provide programming according to a scheduled or set time table. The channel line up of a cable television system is selected by choosing the carrier frequencies of the base band signals and frequency division multiplexing the various carriers together to produce the spectrum of a particular system. On each channel the programs, usually from one half hour to two hours in duration, are scheduled in time sequence. The program schedules change infrequently, normally about once a year when new series are scheduled to replace other less popular programs. The channel line up changes less frequently, usually when a new programmer (channel) is signed onto a system or an old one is taken off.

If a particularly popular episode of a series is missed by a subscriber, and he has not recorded it on a VCR, he may have to wait until the second half of the season when it is rerun to view it. If a special or one time programming event is missed, the subscriber may never have another opportunity to view the program. Movies are in this category where they may not be repeated as often as a subscriber would like.

On demand service systems have been proposed to overcome many of the difficulties in the lack of selection in programming and scheduling. Video on demand, or near video on demand, systems essentially attempt to provide every subscriber the program he wants to view when he wants to view it. However, a pure program on demand system which would have an infinite library which could be addressed at any time by an infinite number of subscribers remains elusive. The cost and complexity or systems which approach such goals even for the limited number of subscribers in a typical cable television system remain prohibitive.

There have been two advances in technology which have brought these systems closer to realization. The first has been the file server technology which permits the storage and retrieval of massive amounts of digital information very quickly. This has made the storage of large programming libraries in digital format more of a reality. To augment this advance in storage technology there has also been the increased use of compression algorithms, particularly the MPEG (Motion Picture Experts Group) algorithm for video signals. Compression allows even more video programs to be stored in the same digital memory size by removing the redundancies in the signal. A standard video signal such as a NTSC formatted signal which is commonly used in the United States has a great deal of spatial redundancy (areas in a scene or field do not change abruptly in hue, tint, and luminance except at boundaries) and a great deal of time redundancy (scenes or fields do not change abruptly in hue, tint, and luminance except for moving objects). The MPEG algorithm has been optimized to eliminate both spatial and time redundancies in video signals and provides for compression of a standard NTSC signal to the extent that 2-10 compressed digital signals can be carried in the same bandwidth (6 MHz) conventionally reserved for a single analog signal.

There remains the problem of the manner in which the stored signals should be broadcast to the subscribers. If they are sent in a compressed digital form, then each subscriber, in addition to the equipment presently in place, should have a digital demodulator, a decompressor, a digital to analog converter, and a NTSC format amplitude modulator. It is readily apparent that such a configuration may add significant cost to such systems. The digital signals also require different processing for authorization and control than do the analog transmissions conventionally used in most CTV systems.

Premium channels from which system operators receive an increasing part of their revenue create more complexity if the digital transmission method is used because their program denial, authorization and addressing methods are incompatible with that of analog systems.

In the past analog systems, a scrambler has been provided to scramble premium television channels at a headend of a cable television system. The applied scrambling precluded reception by an unauthorized converter/descrambler at a connected premises. Data representing the channels or tiers of programming to which the subscriber was entitled were addressably transmitted to a particular converter/descrambler and stored in an authorization memory. As a result of the addressed transmission, a subsequently transmitted program would be authorized by selectively enabling the descrambler portion of the converter/descrambler to descramble the scrambled premium channel or program.

One popular method of analog scrambling is sync suppression where the horizontal synchronizing pulses of the video signal are attenuated in level into the range of the active video portion of a signal so that a subscriber receiver can no longer decode them. The suppression can be static and provide one level of suppression for all synchronizing pulses or dynamic where the level of attenuation is changed either on a field by field basis, a line by line basis, or randomly. To decode this type of scrambling the converter/descrambler at the subscriber must be sent information on the timing of the sync pulses and their attenuation level from some reference. Another method of analog scrambling which is used extensively, either alone or in combination with sync suppression, is video inversion where the active video portion of a particular horizontal line is inverted about a reference level or axis. To decode this type of analog scrambling, the converter/descrambler must be sent information on which lines have been inverted and the reference level of the axis of inversion.

What is needed is an on demand services system which can take advantage of the authorization and control protocols, and the spectrum allocation, of the CTV systems presently in place while still exploiting the newer digital technologies of file servers, compression, and digital control and processing.

An advantageous on demand services system which meets these goals is described in U.S. patent application entitled "Method and Apparatus for Providing On Demand Services In A Subscriber System", filed on Oct. 1993 in the names of Farmer, et al. which is assigned commonly with the present application. The disclosure of Farmer, et al. is expressly incorporated herein by reference.

In the referenced on demand services system it was noted that it was advantageous to use a scrambled analog video signal which had been digitally stored in a file server in a digital format. In one preferred embodiment, the system discloses digitizing a scrambled analog signal and compressing the digitized signal with a compression algorithm, such as the MPEG compression algorithm. While the MPEG compression algorithm and other video compression algorithms work relatively well on the active video portion of a video signal, the synchronizing portions of such signals present a different problem. This is particularly true when the synchronizing portions of the signals have been scrambled using the sync suppression and/or video inversion scrambling methods. Moreover, the descrambling information included in many in band scrambling systems is not easily digitized by such compression algorithms.

SUMMARY OF THE INVENTION

Therefore, it is an object of the invention to provide a method and an apparatus for efficiently and effectively digitizing a scrambled analog video signal.

It is another object of the invention to provide a method and an apparatus for efficiently and effectively converting a digitized scrambled video signal to an analog video signal capable of being processed.

It is a further object of the invention to provide an on demand services system which stores a scrambled analog signal in digital format in a massive memory and converts the digitally formatted signal back to an analog scrambled signal upon retrieval.

It is still another object of the invention to compress at least part of the digital representation of the scrambled analog signal before storage and to decompress it upon retrieval.

According to the invention, in one embodiment a scrambled analog video signal is separated into constitute portions including the active video portion of the signal, the synchronizing portions of the signal and the descrambling information of the signal. The active video portion of the signal is then digitized and compressed according to an efficient video compression algorithm, preferably the MPEG algorithm. The synchronizing portion and the descrambling information are also converted to digital samples and compressed in a manner which is more effective for that type of signal. In the illustrated embodiment, the synchronizing portions which have been scrambled are represented by levels which occur for a fixed period of time. Similarly, the descrambling information in many of the most widely used analog scrambling systems occurs as amplitude modulated pulses either in the synchronizing intervals or on the audio signal. The information contained in both of these portions can be efficiently compressed by a series of digital word pairs describing the level with one word of the pair and the duration of the level with the other word of the pair.

These and other objects, features and aspects of the invention will be more clearly understood and better described if the following detailed description is read in conjunction with the appended drawings wherein:

BRIEF DESCRIPTION OF THE DRAWINGS

FIGS. 8–10 are pictorial representations of the compression encoding of the synchronizing information of several types of scrambled analog signals;

DETAILED DESCRIPTION OF THE INVENTION

Figure 1:
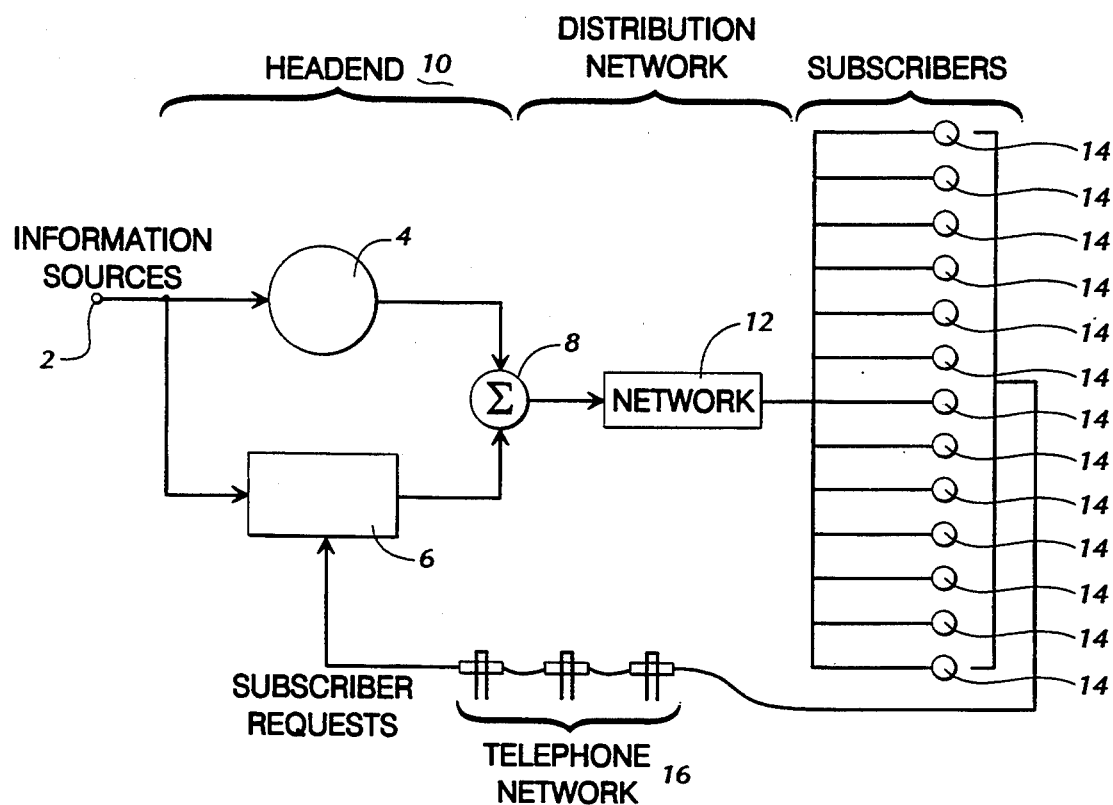
FIG. 1 is a system block diagram of a subscriber system including an on demand services feature constructed in accordance with the invention.

FIG. 1 illustrates a subscription system of the cable television (CTV) type including an on demand services feature constructed in accordance with the invention. The CTV system comprises in general a headend 10, a distribution network 12, and a multiplicity of subscriber terminals 14 located at each of the subscribers premises. The CTV system is a single point to multipoint distribution system configured to transmit to the subscribers a plurality of channels including scheduled programming and on demand programming. Scheduled programming, whether video, audio, or data services, are those information services which are arranged to be broadcast at a specific time and a known channel for a predetermined duration. Each scheduled channel fills its allocated broadcasting periods with selected groups of scheduled programming and the totality of scheduled channels form the scheduled channel line up for the CTV system. The subscribers are not given a direct input into choosing either the channel line up or the schedule for a particular channel. On demand programming, whether video, audio, or data services, are those information sources which can be chosen from a diverse list of programs of a program library at times selected by the subscriber. The on demand programming provides the subscriber the flexibility of choosing those information sources tailored to his tastes with the convenience of adapting their broadcast to his schedule.

In the disclosed system, the subscriber terminals 14 can be conventional in-band converter/descramblers of the analog format type. Each converter/descrambler has a tuner which is capable of tuning a plurality of NTSC format channels in which baseband video and audio signals have been modulated on the carriers of a frequency division multiplexed system. Presently, many converter/decoders 14 have a tuning range of 50 MHz to 750 MHz which may be increased in the near future to 1 GHz or above.

The distribution network 12 for the subscriber system can be composed of different communication links of satellite, coaxial cable, or optical fiber. Such distribution networks are well known and generally include a coaxial cable or fiber optic cable backbone called a trunk from which branches (feeders) of the main CTV spectrum signal can be taken and fed to distribution points. These feeders are then tapped and connected to drops which deliver the signal to the subscriber terminals 14. This type of tree and branch architecture provides a convenient single point to multipoint distribution system for the CTV spectrum generated from the headend 10.

The headend 10 is comprised of two sections which each generate a plurality of analog channels for broadcast on the distribution network 12 from a plurality of information sources 2. The first section 4 is for generating the scheduled programming of the subscriber system and the second section 6 is for generating the on demand programming of the subscriber system. In the embodiment illustrated in FIG. 1, the on demand services channels and the scheduled channels are combined into a single broadband video signal in an RF combiner 8 before being broadcast over the distribution network 12. The CTV system provides the subscribers with a selection of channels where if a scheduled program is desired, it can be viewed or recorded by tuning to the scheduled channel at a predetermined time, or where if a particular on demand program is desired, it can be viewed or recorded at a viewer selected time by tuning to one of the on demand channels after a subscriber request.

The subscriber request, identifying the particular program desired, the broadcast time desired, and optional features such as the language of the broadcast, is transmitted to the on demand services section 6 over a return path. In the illustrated subscriber system, the return path is disclosed as a telephone network 16, but could alternatively be an RF frequency information signal placed in an unused portion of the CTV broadband spectrum.

Figure 4:
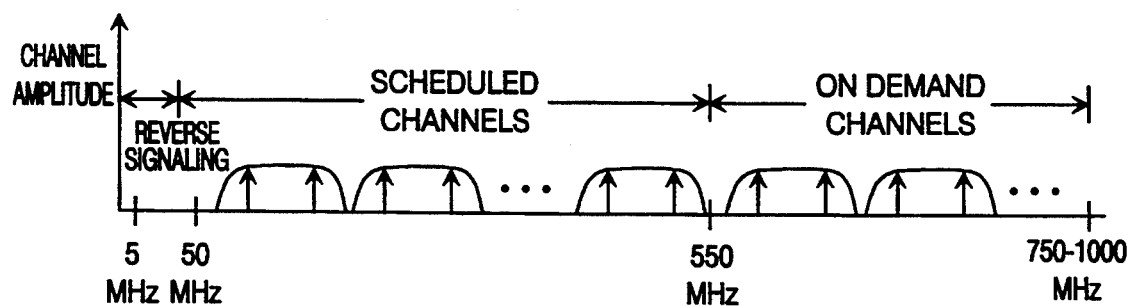
FIG. 4 is a pictorial representation of the broadband spectrum of frequency division multiplexed scheduled channels and on demand channels for the system illustrated in FIG. 1.

The CTV system thus provides a plurality of scheduled channels which, for example, are frequency division multiplexed in a broadband spectrum from 50 MHz to 550 MHz and a plurality of on demand channels which are frequency division multiplexed from 550 MHz to 750 MHz-1 GHz. A representation of the broadband frequency spectrum for the illustrated CTV system is more fully disclosed in FIG. 4. Each channel, whether scheduled or on demand, is of a similar NTSC analog format having a 6 MHz bandwidth including a video carrier, amplitude modulated with video baseband signal, which sets the channel frequency and an audio carrier, frequency modulated with an audio baseband signal, 4.5 MHz above the video carrier. The scheduled programming channels may be either scrambled or transmitted in the clear depending upon the tier structure of the CTV system. The on demand channels are preferably scrambled because the on demand services are contemplated as premium or restricted services and should need authorization for their viewing. It is evident that other frequency allocation than that shown could easily be implemented with out departing from the invention.

While a conventional CTV system with a tree and branch distribution network 12 has been used to give a context for the invention, it is readily evident that the invention is applicable to subscription systems in general and applicable to many different architectures within a CTV system and these elements will be used in an exemplary manner rather than as limitation to the invention. For example, many other single point to multipoint distribution systems, such as direct to home satellite systems or MMDS and other wireless systems, are able to use the invention to advantage. Distribution networks architectures for CTV and other systems including star distribution networks and star to nodal serving area networks are also within the scope of the invention.

Figure 2:
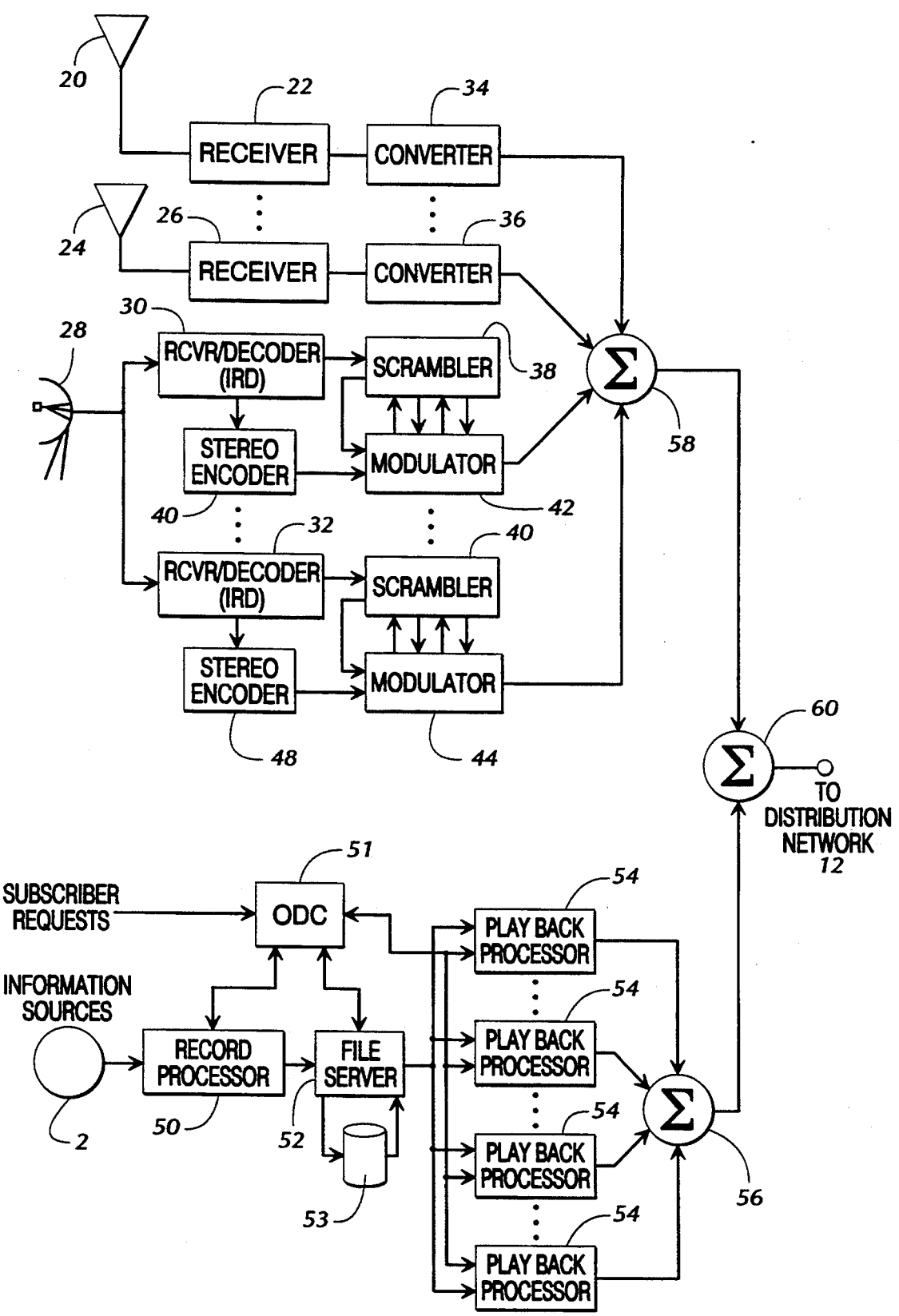
FIG. 2 is a detailed block diagram of the headend of the subscriber system illustrated in FIG. 1.

With reference to FIG. 2, the headend 10 of the CTV system is more fully illustrated. The scheduled programming is provided by receiving broadcasts of programming from commercial or public service programmers which produce such information sources as the national and local networks and special broadcasters such as Showtime, Home Box Office and the like. The scheduled programs are received through off air receivers and antennas 20, 22, 24, and 26 or through earth stations 28 from satellite feeds. If the source of the program has encoded it in a special manner or has scrambled it, the receiver can be an integrated receiver/decoder (IRD) 30 and 32 which not only detects the channel but also decodes the material before it is modulated onto the distribution network 12. The program information for a particular channel, after it has been demodulated and/or decoded, may be broadcast as either a standard tier channel or a premium channel.

A standard tier channel is broadcast in the clear and can be accessed by any subscriber at its broadcast time and is directly modulated onto the cable system by converters 34 and 36. A premium or restricted access channel is one for which the subscriber obtains authorization to view it, generally by paying a premium each billing period to the system operator. To permit the authorization and deauthorization of subscribers, the CTV system scrambles the premium or restricted access channels with scramblers 38 and 40 before modulating the channel signals with modulators 42 and 44. The scrambling prevents unauthorized subscribers from viewing such channels. The scramblers 38 and 40 also produce in-band authorization and control signals in the premium channels so that those subscribers with converter/descramblers 14 who are authorized to view the premium channels can descramble them. For those signals which include a stereo audio component, stereo encoders 46 and 48 process the audio feeds from the IRDs 30 and 32 into a stereo format signal, such a BTSC stereo format, before combing the audio with the scrambled video in the modulators 42 and 44.

The on demand feature of the CTV system includes a recording or input processor 50 which receives program feeds from the information sources and digitizes them for storage in a file server 52. The file server 52 contains a mass memory device 53 which can store a library of programs in digital form and can retrieve them at desired times. The on demand feature further includes a plurality of playback or output processors 54 which cause the program files to be converted back into analog signals. The on demand feature is controlled by an on demand controller 51 which stores files through use of the input processor 50 and plays them back in response to a request by a subscriber by retrieving them from the memory 53 and directing them to the playback processors 54. Program files which are directed to the playback processors 54 are converted to an analog format and then modulated on to carriers selected to form the on demand channels.

The scheduled program channels output from RF combiner 58 are then combined with the on demand channels output from RF combiner 56 in a combiner 60 which can be an RF combiner or a optical combiner depending upon the type of link from the headend 10 to the distribution network 12. The broadband spectrum of frequency division multiplexed channels are then distributed over the distribution network 12 to the individual subscribers.

Figure 3:
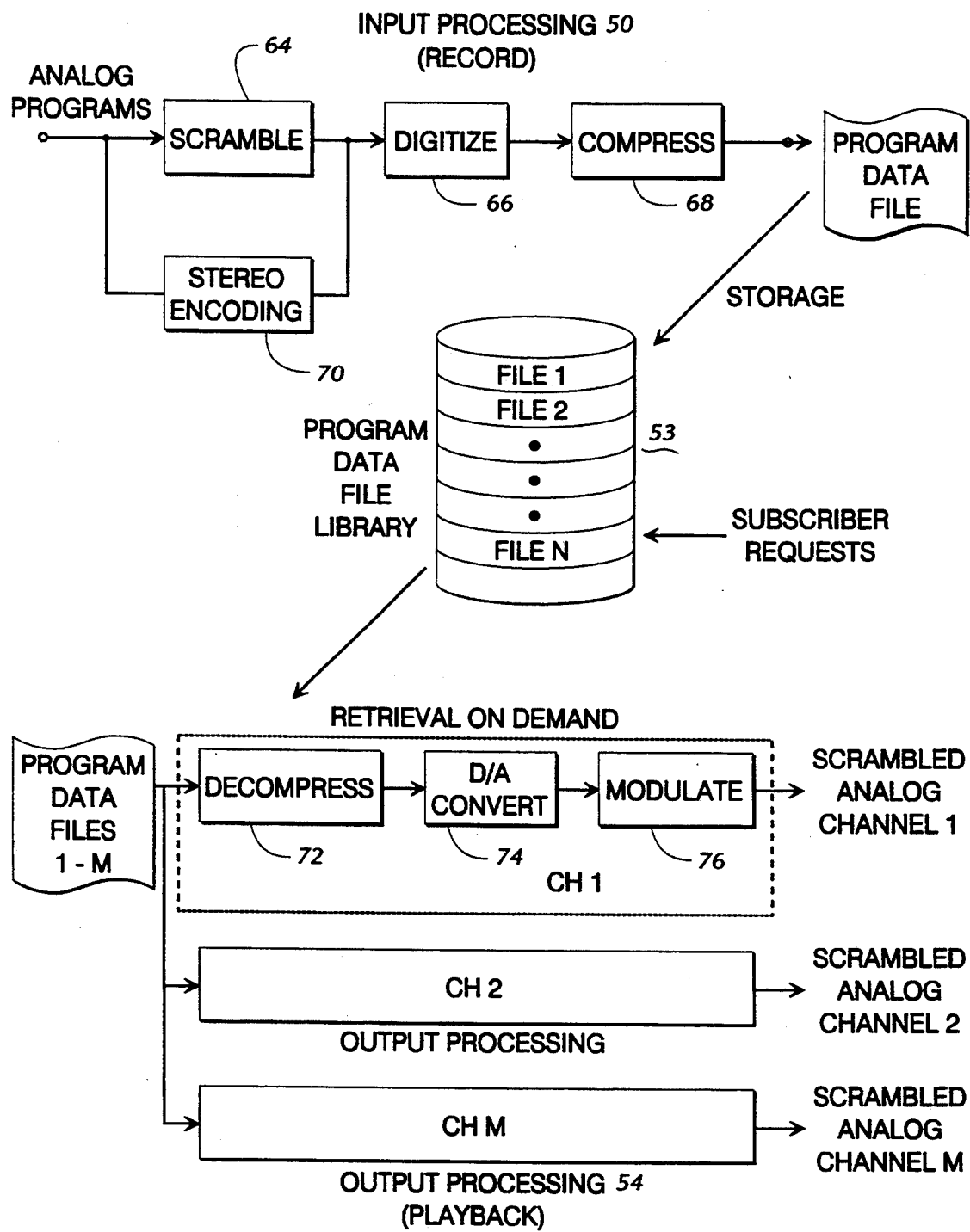
FIG. 3 is a functional block diagram of the data and procedural flow of the on demand services feature illustrated in FIGS. 1 and 2.

In one preferred embodiment illustrated in the functional and procedural block diagram in FIG. 3, the input processor 50 comprises means for scrambling 64, means for digitizing 66, and means for compressing 68 the analog program signals. The scrambling means 64 receives a NTSC base band video signal and scrambles the signal according to one of the conventional analog scrambling techniques or combinations thereof. This scrambled analog signal is then digitized by analog to digital conversion in the digitizing means 66. The digitizing means 66 provides a digital format signal which can be compressed by the compressing means 68 before storage in the file server 52. In the illustrated implementation, the preferred method of compression is the MPEG algorithm which includes not only the present MPEG-1 algorithm and the soon to be announced MPEG-2 algorithm, but also envisions other methods of compressing a digital signal. For those signals with stereo audio components, the input processor also includes a stereo encoding means 70 which encodes the audio signal channels L and R into a BTSC format analog stereo audio signal before being converted to digital format in digitizing means 66.

The digitized signals for each program are combined and stored in program files 1-N in the memory 53 of the file server 52 along with information about their recovery including the time and identification of the program and its source. The compressed program files 1-N representative of the scrambled analog signals can be stored in any order but preferably have a time, program source, and identification pointer stored with them or in an associated portion of the file server memory 53 to aid in their retrieval.

A program file is retrieved in response to a subscriber request for the playback of a specific program and is routed to one of the playback processors 54. The playback processor 54 decompresses that program file with decompressing means 72 before converting it back into analog signal, preferably a scrambled base band NTSC format video signal, with digital to analog converter means 74. If the original audio signal was a stereo signal and stereo data was stored in the program file, the output processor 54 further converts this information back to its analog format and combines it with the video data before modulating the analog signal onto a carrier frequency suitable for transmission on the distribution network 12 with modulation means 76.

By compressing the program files, the mass memory 53 of the file server 52 can be smaller and less expensive than if uncompressed digital signals were stored. A typical compression factor for video signals using the MPEG compression algorithm is between 2 to 10 times depending upon their program content. It is important to note that by scrambling the video signal and/or encoding the stereo audio signal prior to their digitization, compression and storage, only one scrambling means 64 and one encoding means 70 per system need be used. This is a great savings in the amount, complexity and cost of equipment over standard premium channel output equipment which generally include a separate scrambler for each channel and/or a separate stereo encoder for each channel. Moreover, the scrambling of the video signal and the encoding of the stereo audio signal by the input processor 50 assists in the reconstruction of the data signals by the on demand controller 51 and output processors 54 which are not under the burden of managing the scrambling and/or the encoding of a multiplicity of on demand channels while retrieving, decompressing, and modulating them onto the distribution network 12.

With reference to FIGS. 2 and 3, the use of the on demand services feature envisions a write once, read many times storage which is accomplished by the file server 52 and memory 53. The memory 53 contains a program library of program files 1-N any of which may be accessed by any authorized subscriber at substantially any time through subscriber requests to the on demand controller 51. The program files are then viewed on the on demand channels 1-M by descrambling them with a conventional converter/decoder.

The record processor 50 is used to update the program library by processing analog program information to the digital format of the system under the regulation of the on demand controller 51. Programs such as movies can be stored on an indefinite basis while series can be updated weekly and stored for predetermined periods of time. The provision of the record processor 50 which is capable of processing analog program information from many sources, including real time broadcast signals, video tape, and laser disk, etc. makes the program library a dynamic resource to which additions or deletions of program files can be according to the tastes and desires of the subscribers.

To provide for the playback of a program file, the on demand controller 51 receives a subscriber request for a particular program to be viewed at a predetermined time. The subscriber request then defines the destination of an identified program file and its broadcast time. At the time requested by the subscriber, the program file is retrieved from the memory 53 by the on demand controller 51 for broadcast. The program file is stripped of the identification portion of the file and directed by the on demand controller 51 to one of the playback processors 54. The on demand controller 51 assigns a playback processor 54 whose output channel is not in use at the time of the program. The on demand controller 51 can playback up to M programs simultaneously by time sharing the output of the memory 53 among the plurality of output processors 54.

The requesting subscriber is addressed, notified of the assigned channel, and authorized to view the program channel assigned for the duration of the program, providing an unused on demand channel is found by the on demand controller 51. Otherwise, the on demand controller 51 will address the subscriber and send him the message that all on demand channels are presently in use and notify him of the next open block of time which he can request. Standard authorization and control signals are used for this process which are compatible with those used for the premium channels of the scheduled programming.

The program file is sent to the selected playback processor 54 to be decompressed and converted into a scrambled analog baseband video signal and an analog baseband BTSC encoded stereo audio signal. The scrambled video signal is amplitude modulated onto the video carrier of the on demand channel and the encoded stereo audio signal is frequency modulated onto the sound carrier of the on demand channel by the modulating means 76. The program is then viewed by the subscriber by tuning to the assigned on demand channel. The authorized descrambler of the converter/descrambler 14 of the requesting subscriber descrambles the program conventionally to produce a viewable program for the requesting subscriber while denying access to all the other subscribers of the CTV system.

The equipment configuration of the on demand feature comprising the on demand controller 51, the recording processor 50, the file server 52, and the plurality of playback processors 54, can be used for other services than on demand services. What makes the presently described feature an on demand feature is the particular method of playback of the program files and the processing of the subscriber requests. It is evident that other types of services including conventional scheduled services, pay per view services, and near video on demand services could also be provided by this configuration.

For a scheduled services feature, the controller 51 would select programs from the program library according to a schedule and broadcast them on particular channels at scheduled times by routing them to the appropriate playback processor 54 at the broadcast times of the schedule. To transform a scheduled services feature into a pay per view feature, the controller would cause the authorization of particular scheduled programs at their broadcast times based upon requests form the subscribers.

For a near video on demand feature, the controller 51 would cause the playback of a particular program sequentially on a particular channel, and the same playback sequence offset in subintervals of the program duration on one or more other channels. In this type of system, an authorized subscriber would have to wait at the most one of the offset subintervals to view the particular program.

To obtain a better understanding of the process by which the scrambled analog video signal is digitized and compressed, it will be helpful to review and compare common analog scrambling techniques used in CTV systems today. In general, the two most common analog scrambling techniques used in CTV systems are video inversion and sync suppression. In more sophisticated versions, these types of scrambling may be combined to make the overall scrambling more secure, and in still other forms, the axis of inversion encoded on a level by splitting the sync pulse into multiple levels. These systems may also have multiple modes where different levels are used either staticaly or dynamically. However, whatever combination is used the underlying principles and techniques of analog scrambling are substantially similar.

In the video inversion technique, the active video portion of the video baseband signal is inverted about a reference level termed the axis of inversion. To unscramble the signal, a descrambler needs to know which horizontal lines have been inverted and the level of the inversion axis. In sync suppression, the level of the horizontal synchronization pulses and blanking pulses have been reduced in amplitude so they are no longer the most negative portion of the video signal. To unscramble the signal, a descrambler needs to know the timing of the horizontal synchronizing pulses, which pulses are suppressed, and the level of their suppression. The information necessary to unscramble the sync suppression type of scrambling has generally been carried on timing pulses of various levels and durations which amplitude modulate the sound carrier of the scrambled channel.

FIGS. 5A–5D illustrate two types of common scrambling methods in use in CTV systems which will be termed scrambling type A (FIGS. 5A–5B) and scrambling type B (FIGS. 5B–5C) for ease of reference. Both types of scrambling shown are combinations of video inversion and sync suppression, and utilize split sync (multilevel) pulses. FIG. 5E is a standard NTSC baseband video signal which will be used for comparison purposes. The reference figure illustrates a horizontal line of the unscrambled baseband video signal where a horizontal blanking interval (HBI) is followed by various levels of luminance in an active video portion of the line. The horizontal blanking interval includes a horizontal blanking pulse with a front porch at the horizontal blanking level (HBL), a horizontal synchronizing pulse (HSYNC) which reaches a sync tip level, and a back porch including a breezeway at the HBL, a several micro second long 3.58 MHz color burst (CB), and an end portion.

Figure 5A:
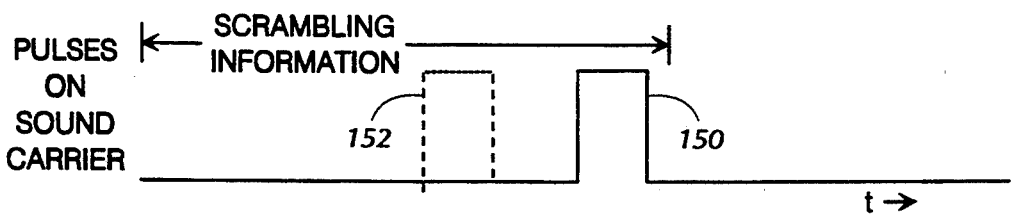
FIGS. 5A, 5B, 5C, 5D, and 5E are pictorial representations of video baseband signals using common analog scrambling methods in use in CTV subscriber systems in comparison to a reference waveform.
Figure 5B:
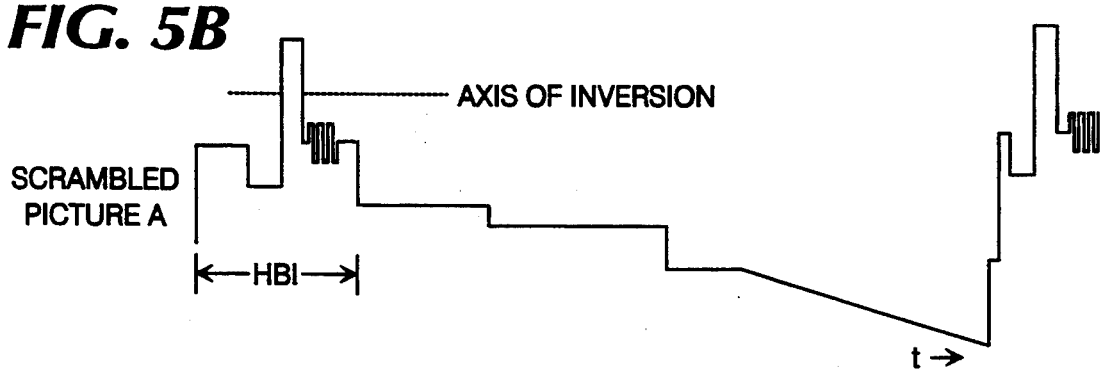

In scrambling type A shown in FIGS. 5A and 5B, the active video portion of the signal can be inverted about an axis at some reference level, usually 30 IRE units and the synchronizing portions, the horizontal and vertical blanking and synchronizing pulses, are encoded or changed from their regular level (suppressed −6 dB). The horizontal blanking interval in this example has been altered to produce a split in the synchronizing pulse such that it is in two parts with a maximum level and a minimum level. The axis of inversion information is contained in the split synchronizing pulse as the average of the minimum and maximum levels. In FIG. 5A, associated in a timed relationship to the horizontal synchronizing pulses are descrambling pulses 150, usually amplitude modulated onto the audio carrier but here shown at baseband for clarity, which carry descrambling information by their positioning and level and possibly duration. Scrambling method A uses relatively wide pulses on a line by line basis which are offset from the horizontal blanking interval by a variable time which is programmable between the scrambler and descrambler. These pulses 150 are descrambling information to be used by the corresponding converter/descrambler 14 at the subscriber location to descramble the channel. Additionally, there may be a second pulse 152 on the audio waveform of certain horizontal lines which indicates other control data for descrambling modes or for other authorization, addressing and control functions of the converter/descramblers 14. The scrambling information occurs in a window of time related to the start of the HBI. This method of scrambling and a device for accomplishing such are more fully disclosed in U.S. Pat. No. 4,924,498, entitled "Metod and Apparatus for Improving Scrambling and employing Split Sync Pulses", issued May 8, 1990, the disclosure of which is incorporated herein by reference.

Figure 5C:
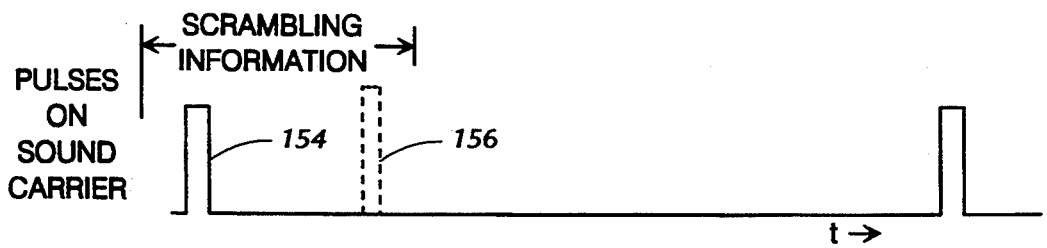
Figure 5D:
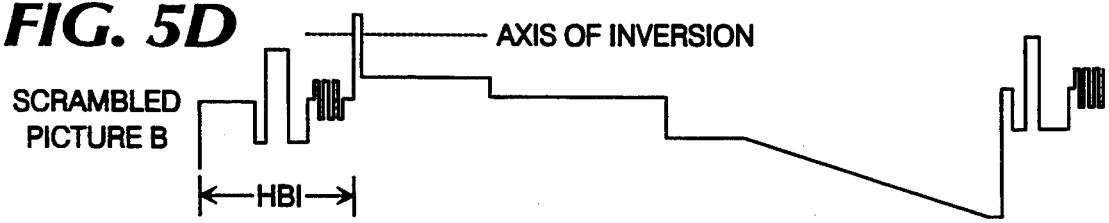
Figure 5E:
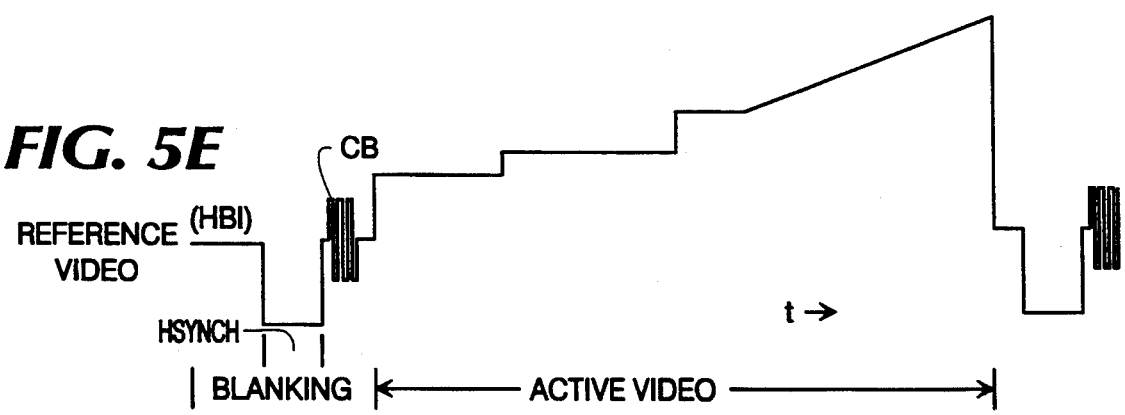

FIG. 5C and 5D disclose the type B method of analog scrambling in use today. The synchronizing pulse is suppressed either −6 or −10 dB (with respect to a cut off level of 120 IRE units). The synchronizing pulse is also split in the middle with the center portion rising to 50 IRE units before suppression. In this method the active video portion is inverted about the 50 IRE unit axis represented by the raised center portion of the synchronizing pulse. Associated with these scrambling of the video and synchronizing features of the signal is descrambling information in the form of pulses 154 which are amplitude modulated on the audio carrier (shown at baseband in the figure for clarity). The relatively short pulses 154 are placed on the sound carrier at the beginning of each horizontal blanking interval and result in the synchronizing pulses being restored to their original levels and the video being reinvented according to the timing of the pulses. As in the previously described scrambling method, there may be a secondary pulse 156 on each horizontal line which can relate to the mode of scrambling, or other authorization, addressing and control information. The scrambling information for this system also occurs in a window related to the start of the HBI. This method of scrambling and a device for accomplishing such are more fully disclosed in U.S. Pat. No. 4,598,318, issued Jul. 1, 1986, the disclosure of which is incorporated herein by reference.

With either of these scrambling methods or others, it is important that all three relevant pieces of information about the scrambling should be maintained. The active video, the synchronizing portions of the signal, and the descrambling information all contain necessary data which can not be lost without detrimental effect on the reconstruction of the signal. The invention effectively digitizes and compresses such information without the loss any data needed to reconstruct the signals.

Figure 6:
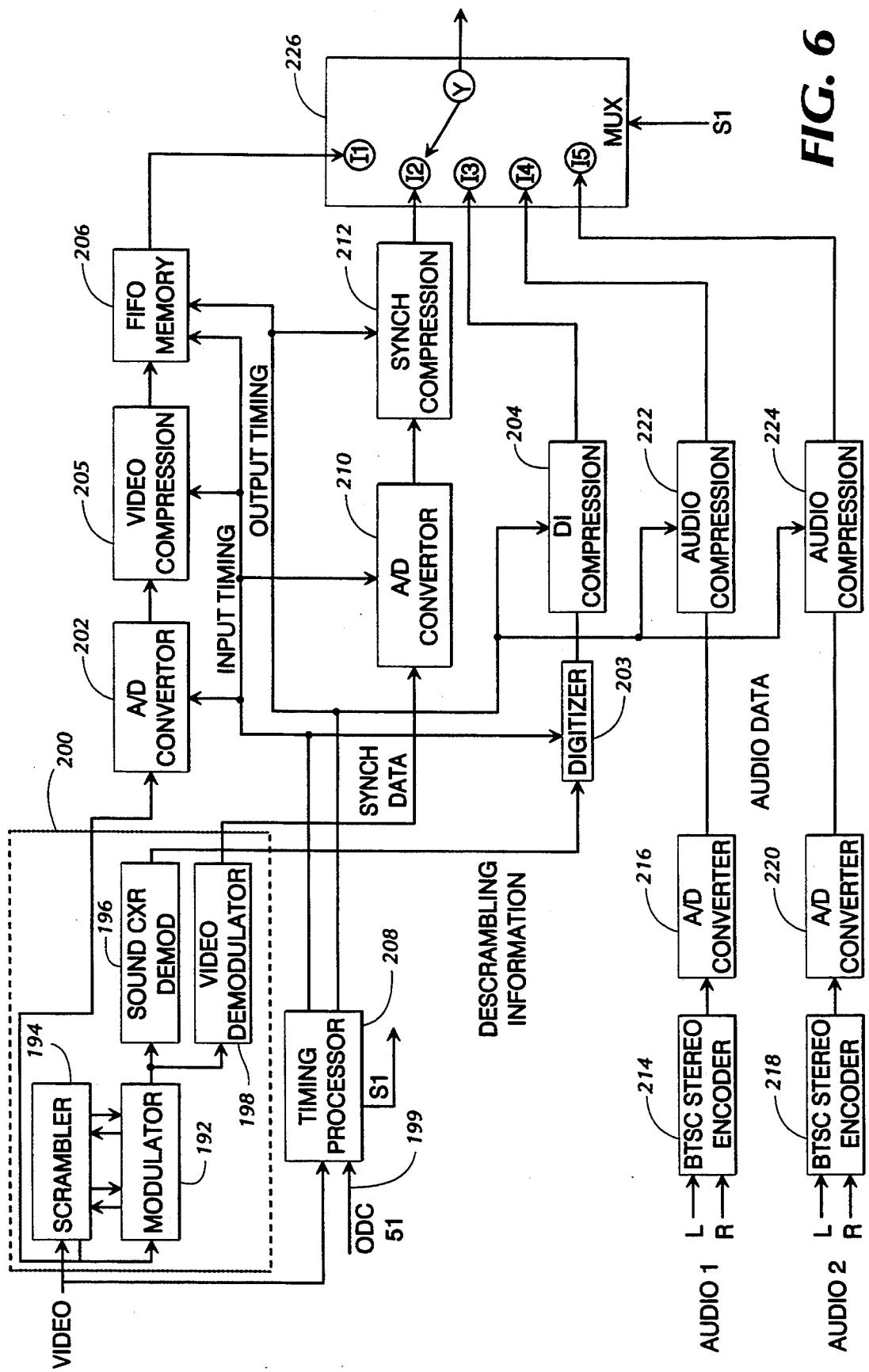
FIG. 6 is a detailed block diagram of the input processor for the on demand services feature illustrated in FIG. 2.

With reference now to FIG. 6 there is shown a detailed block diagram of the input processor 50. The input processor 50 functions to process analog video, audio, and/or data program sources into a digital format suitable for storage in the memory 53 of the file server 52. Additionally, it may efficiently compress the digital information so that it can be stored in less memory than it would normally require. In the illustrated embodiment, an analog program source, such as a video tape recorder, laser disc, real time production signal from a video camera, satellite receiver, UHF or VHF receivers, or the like, is input to the input processor 50 as a baseband video signal and a baseband audio signal. Preferably, these inputs are in an NTSC format where horizontal and vertical blanking and synchronizing signals are provided as pulses of a predetermined level and duration along with associated active video portions which are of varying amplitudes from a reference level. The video baseband signal comprises a conventional 525 horizontal line signal of two fields/frame which has a frame rate of 30 frames/second. The audio signal (AUDIO 1 ), which corresponds to the video signal, is a either a monaural signal of between 20 Hz to 20 kHz or a stereo audio signal having conventional dual stereo audio channels L and R, each between approximately 30 Hz to 15 kHz. For those video signals in which the primary audio is accompanied by a second alternate language source, there is provided another audio signal (AUDIO 2) either monaural or having dual stereo audio inputs L and R.

The baseband video signal is scrambled by a scrambling means 200 which is preferably comprised of conventional equipment that is compatible with the other scrambling equipment of the premium scheduled channels at the headend 10. This permits the signals which are stored in the file server memory 53 to be reproduced in a standard scrambled format which can then be broadcast and decoded by any of the converter/descramblers 14 of the subscription system.

Accordingly, the scrambling means 200 comprises a scrambler 194 and a modulator 192 pair of the same type as the premium channels of the scheduled programming, for example, those shown in FIG. 2 as elements 38 and 42. These components are commercially available and ensure the compatibility of the scrambled on demand signals with the scrambled premium channels of the scheduled programming. Because the output of the scrambler 194 and modulator 192 is an RF composite channel signal, the scrambling means 200 includes a video demodulator 198 which strips the video carrier from the video signal to return it to baseband and an AM demodulator 196 which separates the descrambling information pulses from the audio carrier of the RF channel signal.

The scrambling means 200 outputs a scrambled baseband video signal to an analog to digital converter 210 and a sync compressing means 212. The scrambled video signal is preferably of the identical format which is provided to a headend modulator before a video carrier is added and it is transmitted on the distribution network 12. A similar baseband video signal with only video inversion scrambling is provided to the analog to digital converter 202 and thereafter to video compressing means 205 and a FIFO memory 206. The scrambling means 200 also provides descrambling information for the scrambled video in the form of pulses at times related to the video signal to a digitizer 203 and a descrambling information compressing means 204.

This divides the video baseband signal into three parts where each part can be separately processed in the most efficient manner. The active video portion is processed in one path by elements 202, 205, and 206. The synchronizing portions are processed in a second path by elements 210 and 212 and the descrambling information is processed in a third path by elements 203 and 204.

A timing processor 208 controls the timing of the data transfers and process flows of the input processor 50. The on demand controller 51 enables the input processor 50 via control line 199 at the same time that it routes an analog program to the input of the processor. The timing processor 208 samples the baseband video signal and produces input timing signals for the analog to digital converters 202, 203 and 210, for the compressor 205 and for memory 206. The horizontal and vertical sync pulses are used to time the A/D converter 202 and compressor 205 to digitize and store the active video portion of each horizontal line. The active video signal is digitized at a rate which will not cause the loss of the video information, for example, at 4 times the subcarrier frequency. The video compressor 205 then compresses these digital samples, eliminating as much of the spatial and time redundancy as possible with the MPEG algorithm. The standard MPEG data rate and data blocks are used to load the memory 206 with the compressed active video data and associated data headers.

The A/D converter 210 is also timed by signals from the timing processor 208 to convert the synchronizing portions of the scrambled video signal to digital format. The rate of conversion may be slower than that of the active video because, although the synchronizing portions contain important information, there is much less of it and it is at lower frequencies. The digitizer 203 need only be timed to convert the scrambled video signal during the HBI. The digital representations of the synchronizing portions are then further compressed according to an efficient technique by sync compressor 212.

Similarly, the timing processor 208 uses the timing of the baseband video signal to control the digitization of the descrambling information by digitizer 203 as it occurs periodically (once every horizontal line) in a particular time window. The digital representations of the descrambling information is then compressed by an efficient algorithm in descrambling information compressor 204.

Figure 7:
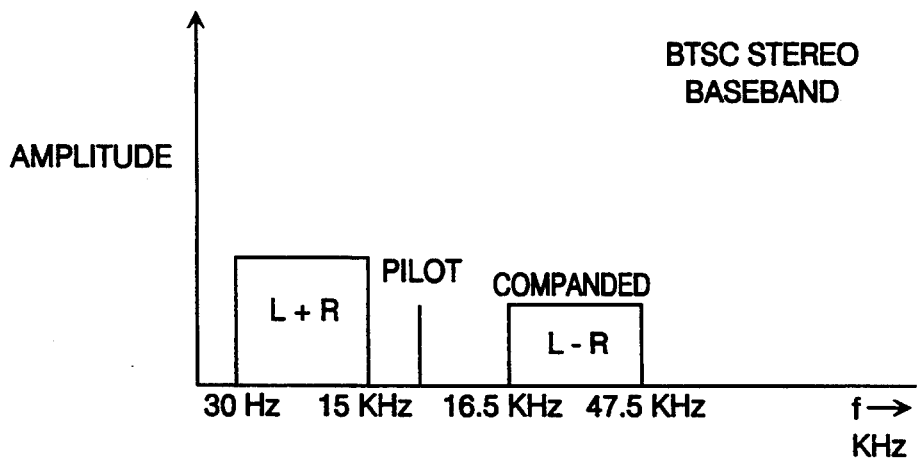
FIG. 7 is a pictorial representation of a BTSC encoded stereo audio baseband signal.

The audio channels L and R from each of the alternate language inputs are encoded in BTSC (Broadcast Television Systems Committee) stereo encoders 214 and 218 to form two baseband audio signals. Standard stereo encoders are available for this function and generate baseband BTSC stereo audio signals of the format illustrated in FIG. 7. While the BTSC stereo standard is described because of its wide use and acceptance, the stereo encoders 214 and 218 could use other methods of encoding the stereo channels L and R into a composite signal. The EIA-J (Electronic Industries Association-Japan) stereo encoding or NICAM stereo encoding would also be acceptable. The stereo audio signals are digitized in analog to digital converters 216 and 220 at rate in excess of twice the highest frequency of the stereo baseband signals, preferably approximately 100 kHz. If the stereo standard is NICAM, then the digitaization step can be disregarded because NICAM is a digital standard and its encoders output a digital signal. The digital samples of the stereo audio data, whatever format is chosen, may then be compressed by an efficient algorithm for that type of data by audio compressors 222 and 224. The audio signals may be compressed by the audio compressors 222 and 224 which use run length encoding algorithms, sub-band encoding algorithms, or other compression techniques.

The digital samples generated by the analog to digital converters 202, 210 and 203 are input to three different types of digital compressors 205, 212, and 204 because of the difference in the type of data generated and the ease of its compressibility. The digital compressor 205 is used to compress the digital samples of the active video portion of the video signal, the digital compressor 212 is used to compress the digital samples of the synchronizing portions of the video signal, and the digital compressor 204 is used to compress the digital samples of the descrambling information of the video signal.

The digital compressor 205 chosen for the active video portion is one which utilizes the MPEG algorithm, either MPEG-1 or MPEG-2, because of the efficient manner in which it can compress the digital information representative of the active video portion of the video signal. Because the scrambling applied to the active video is video inversion, the signal appears to the video compressor as though it were not scrambled.

However, commercially available MPEG compressors can not handle the compression of the descrambling information and the synchronizing portions of the video signal, or do not handle them effectively. This is because the input to such compressors is expected to be a standard video signal without sync suppression and split sync features. The descrambling information can not be compressed because the MPEG compressor expects a baseband audio signal and there is no input for the extra information signal. The invention solves this problem by providing special data compressors 212 and 204 which are optimized for the compression of the scrambled synchronizing portions of the video signal in one instance and the compression of the descrambling information in the other.

Examples of the information compressed and an explanation of the compression algorithm of the sync compressor 212 is more fully set forth in FIGS. 8–10. The description discloses that a scrambled synchronizing portion of the video signal, particularly a horizontal blanking interval of about 10 microseconds, can be described as a series of pairs of reference levels and measured times from the start of each synchronizing pulse. For example, a scrambled horizontal blanking pulse and synchronizing pulse having type B scrambling is shown in FIG. 8, where at time t0 the signal begins the a nominal start of the blanking interval at a reference level of 50 IRE units. At the start of the synchronizing pulse at t1, the level shifts to 30 IRE units and holds there until the split of the pulse begins at time t2. Between times t2 and t3, the reference level is the split sync level. The reference level shifts back to the sync tip level at t3, and at time t4, the reference level shifts to the back porch reference value, usually the same as the front porch value 50 IRE units, and the chroma burst of 3.58 MHz begins several microseconds later. At time t5, the horizontal blanking interval ends and the active video portion begins.

The synchronizing portion of a scrambled video signal with synch suppression and video inversion can be encoded into six pairs of digital words, where one word of the pair describes the times t0–t5 with respect to a reference time and the other word in the pair describes the reference levels associated with the times. FIG. 10 illustrates a table using this method where times t0–t5 have been given a code (−1, 0, 1.2, 3, 4.7, 9.2) representing their relative timing to a reference. In the figure these codes are the number of microseconds before and after the reference, the start of the horizontal synchronizing pulse. Associated with each of these codes are pair codes (180, 160,205, 160, 180, 230) that are representative of the relative amplitude of the signal at the time. It is further a feature of the sync compressor 212 that it need not send a description of the compressed synchronizing portions for each horizontal line. The system advantageously determines the pattern of the synchronizing portion of the signal for the initial line or several lines of a scrambled video signal and, if it does not change, can then sends the pattern only periodically which indicates to the playback processor 54 that the same pattern is to be used between transmissions. In the preferred system the synchronizing information is updated every video frame, or 30 times a second.

Figure 11:
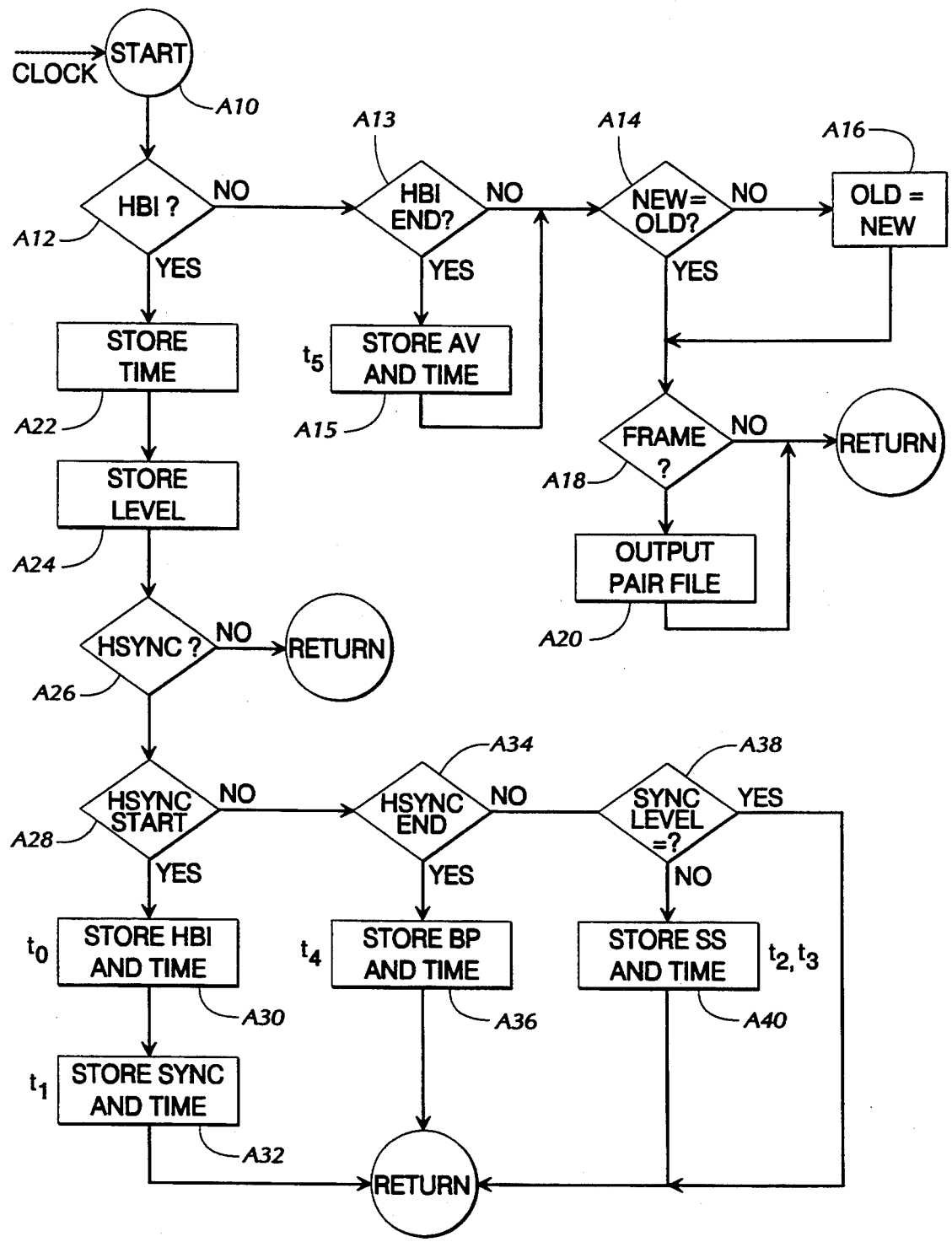
FIG. 11 in a detailed flow chart of the functional operation of the sync compressor illustrated in FIG. 6.

FIG. 11 is a detailed functional flow chart of the sync compression process of the sync compressor 212. The input to the process is the digital samples from the A/D converter 210 and the output is a file of digital pairs as that shown in FIG. 10 have a level and a time. Basically, the process generates a temporary data file comprising the vales of all samples of the of the HBI and their relative times. This temporary file is compressed into the pair file described by using timing signals from the timing processor 208 which indicate landmarks in the HBI.

The process is run by the same clock which is used for the A/D processor 212 and starts in block A10 after each conversion. In Block A12, the process determines whether the conversion is in the HBI interval. If it is not then the process is in the active video portion of the signal and has completed generating a pair file. The just completed pair file (new) is compared to the last pair file (old) developed to determine if they are the same in Block A14. They will usually be the same as the analog scrambling should remain the same over most of the lines and should change only seldomly, if at all. However, if there is a change and a new pair file is generated, then in Block A16 the new pair file will replace the old file before the process continues at Block A18. The program then determines if it is time to output the pair file to the pair file to the program file. In the present example the pair file is generated once every video frame by Block A20. The process will the return to Block A10 until the next HBI.

During the HBI, the test in Block A12 will be passed and the process will store the value of the sample and the relative time of the sample from the A/D conversion of the synchronizing information in Blocks A22 and A24. This data is placed in a temporary file to be further compressed during the subsequent steps of the process. The storage of the measured synchronizing information continues until the sync pulse is detected in Block A26. This causes the series of tests in Blocks A28, A34, and A38 to be performed to determine if the present sample is the start of the sync pulse, the end of the sync pulse or somewhere in between. The beginning of sync indicates the t1 time and in Block A32 the level and time stored for that sample is converted into the code of FIG. 10. The level and time corresponding to the time t0 (−1 microsecond from HSYNC) is calculated form the temporary storage and the code pair corresponding to the nominal HBI start is stored in the pair file in Block A30. Similarly, at the end of the sync pluse as determined in Block A34, the process stores the code pair relating to the time t4 in Block A36 and, at the end of the HBI as determined in Block A 13, the process stores the code word relating to time t5 in Block A15. If the scrambling method has a split sync, the test in Block A38 will determine there has been a level change in the sync pulse and Block A40 will store the code pair for the level change, for example at times t2 and t3.

The invention therefore provides a system the can advantageously compress the synchronizing portions of the video signal efficiently for many types of scrambling while handling static and dynamic scrambling modes of the same signal. This produces a compression system which is transparent to the scrambling method and can also handle nonscrambled signals efficiently.

Preferably, the descrambling information compressor 204 acts in a similar manner to compress level changes of descrambling pulses into a pair file including a representation of each different level and the time with respect to a reference of its change to another level. In the compressor 204, the window of compression would include the time during which descrambling pulses could occur and the reference could be time relative to the start of the HBI.

The timing processor 208 controls the timing of the output of the FIFO memory 206, and compressors 204, 212, 222, and 224 to assemble a data stream comprising the data from these elements. Each of the five compressed data streams is output from the respective compression means and reassembled at the inputs I1–I5 of a digital multiplexer 226 which causes the digital information to be concatenated into a single bit stream.

In the preferred embodiment, this can be accomplished by the compressors also having first in, first out (FIFO) memories which are stored with the respective data at one clock rate and read from the memories at a different clock rate. However, it is evident that the FIFO memories could be a random access memory which has separate read/write capability and a memory control to accomplish the buffering and time base correction.

Figure 12:
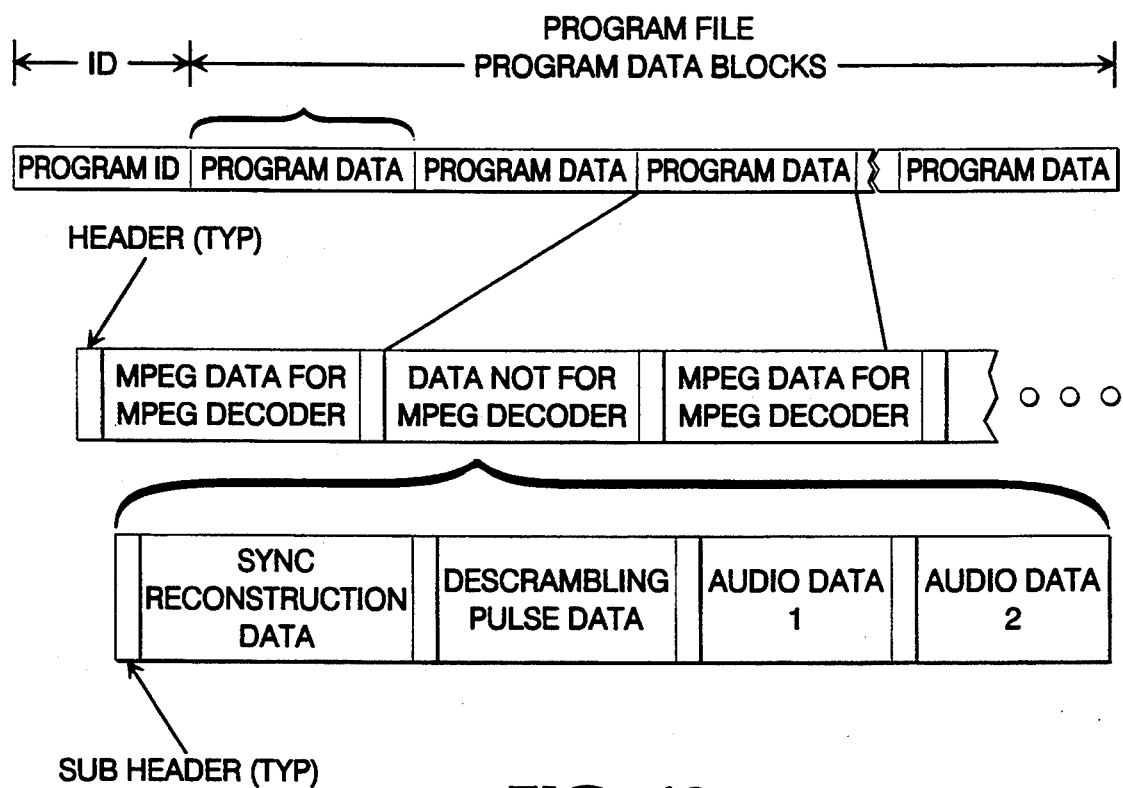
FIG. 12 is a pictorial representation of the data protocol for storing and retrieving program files in the file server of the on demand services feature illustrated in FIG. 2.

A representative data stream for storage in the memory 53 of the file server 52 is illustrated in FIG. 12. Each program file has a program file identification section of variable bit length which stores at least one representation of the program identification, the source of the program file, and/or its scheduled time, e.g. when it was shown on the subscription system on its regularly scheduled basis. Next come a series of program file data blocks of variable length, each relating to the information associated with the original scrambled video signal and associated audio signal. The program file data blocks include variable length sections for the compressed active portion of the video, the compressed synchronizing portions of the video, the compressed descrambling information, and the audio information associated with the video. While a particular order has been shown in the illustration of FIG. 12 as an example, these sections do not necessarily have to be stored or transmitted in such order. Each different section of a program file data block begins with an indicator which indicates the beginning of a particular type of data block. Each program data block contains at least one of these sections and if it contains multiple sections they can be in any order.

In the preferred embodiment, the video section is first and has a video indicator followed by the compressed data from the MPEG compressor for the active portion of the horizontal line. Next is a nonvideo section with a subsection for the synchronizing information which begins with a sync subheader heading the pair file which has been sent. If there is no sync subheader, this indicates to the playback system that the same scrambled sync portion used previously should be used to reconstruct the signal. The next indicator is a subheader for the scrambling information which indicates that the signal has scrambling data to be decoded. The scrambling information includes the data representative of the number of descrambling pulses associated to a particular horizontal line, their duration and level (if relevant), and their time with respect to the start of the horizontal blanking interval. Additionally, one or two subsections for the audio data is provided by an audio subheaders, each followed by a block of audio data. In the preferred embodiment there are two audio sections, each containing a compressed block of BTSC encoded audio information. Further each block of audio information has been recorded in a different language. The permits for a dual language system in which the playback processor can recreate the language desired based upon either a decision at the headend 10 or a request by the subscriber.

Figure 13:
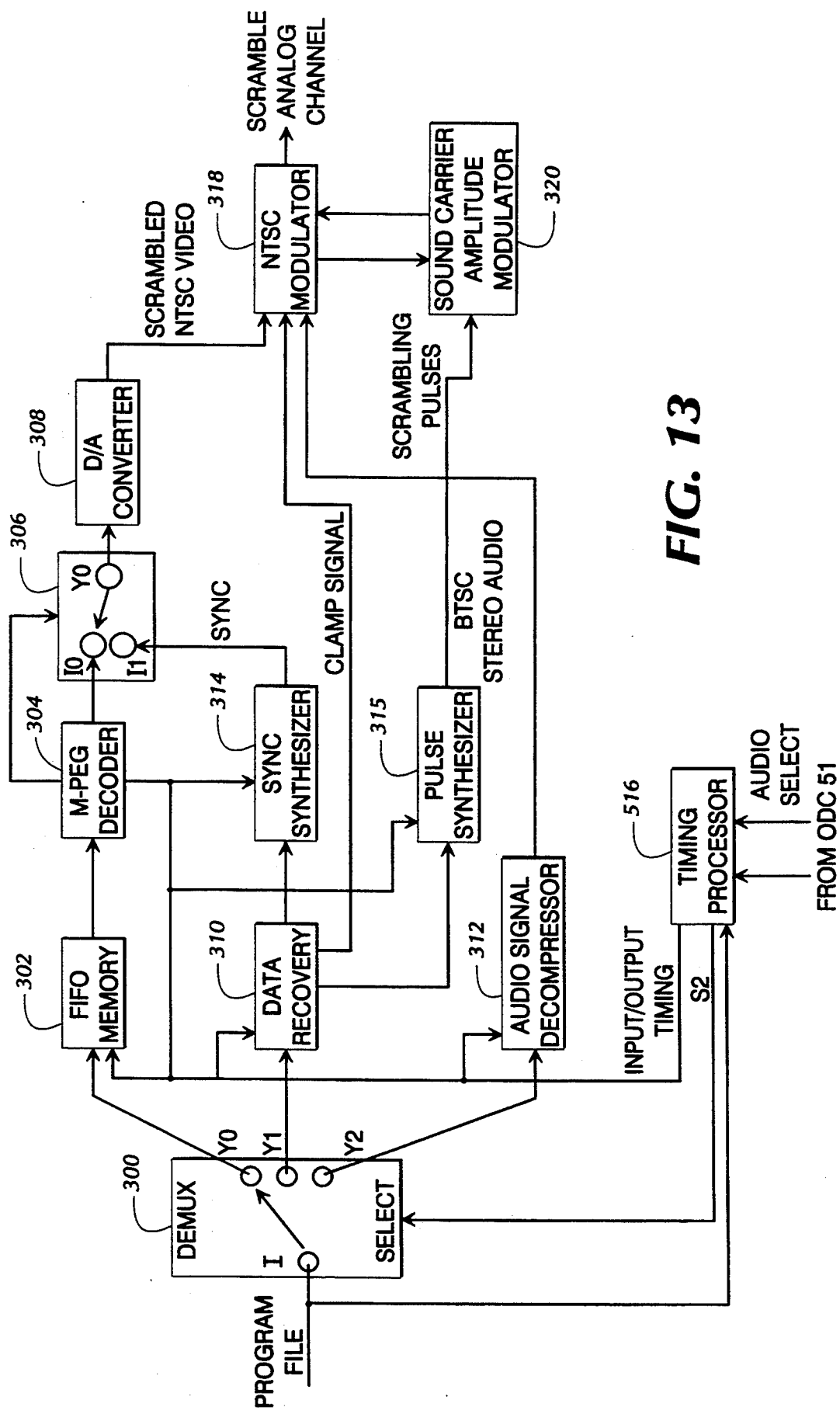
FIG. 13 is a detailed block diagram of one of the output processors for the on demand services feature illustrated in FIG. 2.

A description of the detailed block diagram of the playback or output processor 54 will now be made with reference to FIG. 13. A data stream in the same format that was input to the memory of the file server 52 is recovered by the on demand processor 51 in response to a request that identifies one of the stored identifiers in the program file. The program identification data is stripped from the program file and the program data routed to one of the output processors. The input of the playback processor 54 is the receive terminal I1 of a digital demultiplexer 300. The demultiplexer 300 has at least three outputs Y0–Y2 which correspond to different sections of the program data file. As was the case in the compression process, the decompression process uses separate decompressors for each section of the program data file.

The beginning or header of each section is detected by a timing processor 316 and a particular part of the data stream directed to a different path depending upon the type of data. The video data is input to FIFO memory 304 and video decompressor 304 in one path, the synchronizing and descrambling information input to a data recovery means 310 in another path, and the audio information directed to an audio decompression means 312 in a third path. The multiplexer 300, memory 320, decompressor 304, and data recovery means 310 allow a program file to be retrieved from the memory 53 at one rate and reassembled at the NTSC rate to supply a scrambled analog video signal. The memory 302 and a similar memory in data recovery means 310 are for buffering the program signal and for time base correction. In the preferred embodiment this can be accomplished by individual first in, first out (FIFO) memories which are stored with the respective data at one clock rate and read from at a different clock rate. However, it is evident that the FIFO memories could be a random access memory which has separate read/write capability and a memory control to accomplish the buffering and time base correction.

The output of memory 302 is connected to the decompressor 304, which is preferably a MPEG decoder, which causes an expansion of the digital information of the active video portion of the signal into decompressed digital information at the NTSC rate. Similarly, the data recovery means 310 and sync synthesizer 314 cause a decompression of the information of the synchronizing portion of the signal into digital information representative of the scrambled sync. The data recovery means 310 and pulse synthesizer 315 cause a decompression of the scrambling information into digital pulses which may be modulated on the sound carrier. In addition, the data recovery means 310 also produces a clamp signal which indicates to the modulator 318 when the most negative portion of the video signal (sync tip) should occur.

The MPEG data contains reference times embedded in the its data which would allow the decoder 304 to reinsert synch in the compressed video, if the signal were not scrambled. The timing processor 316, sync synthesizer 314, pulse synthesizer 315 use this timing data from the MPEG decoder 304 to resynchronize the video, the audio, and the descrambling pulses. The data recovery means 310 also uses this timing data to synchronize the clamp signal.

Figure 14:
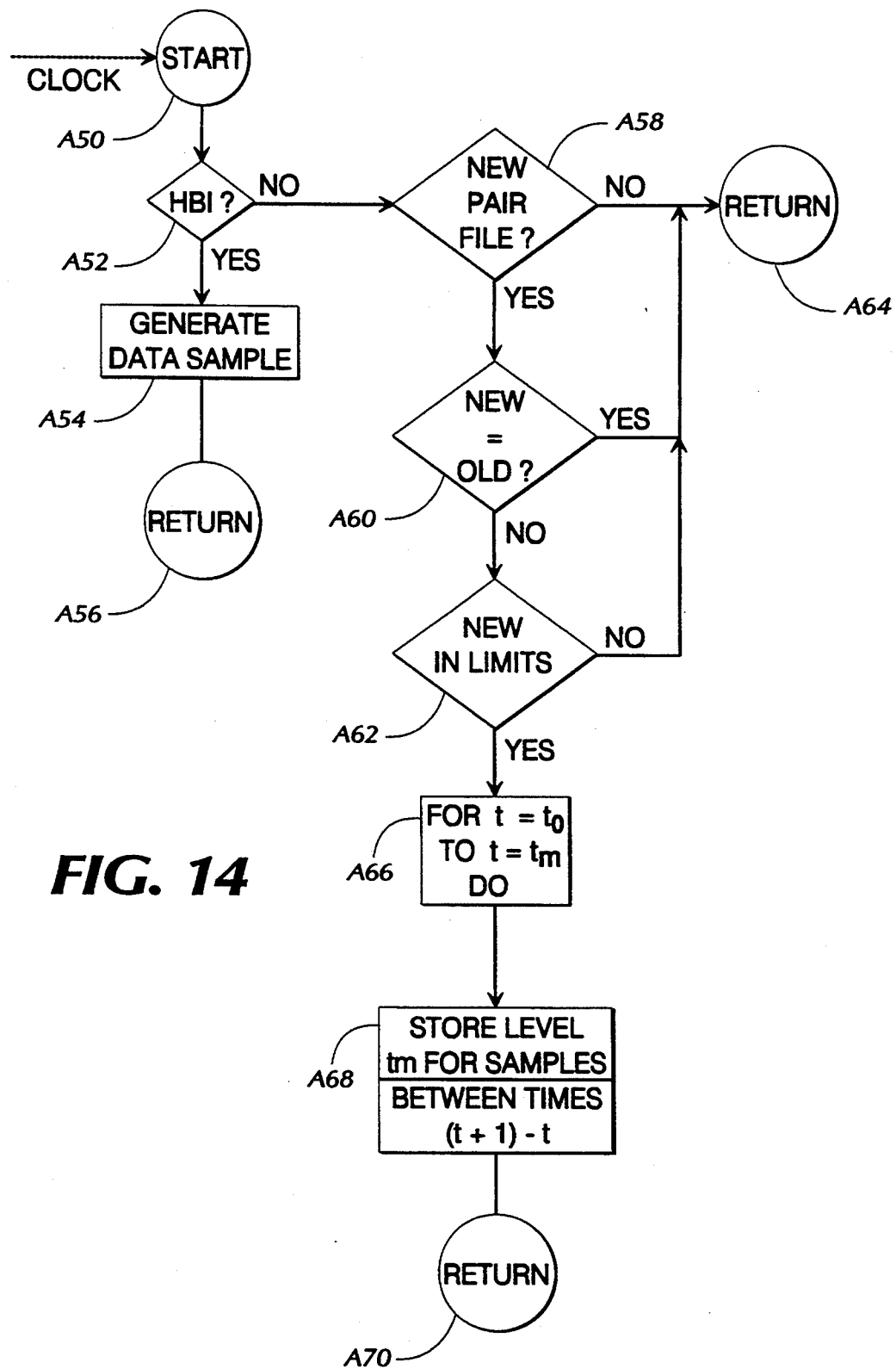
FIG. 14 is a detailed flow chart of the functional operation of the sync decompressor illustrated in FIG. 12.
Figure 15:
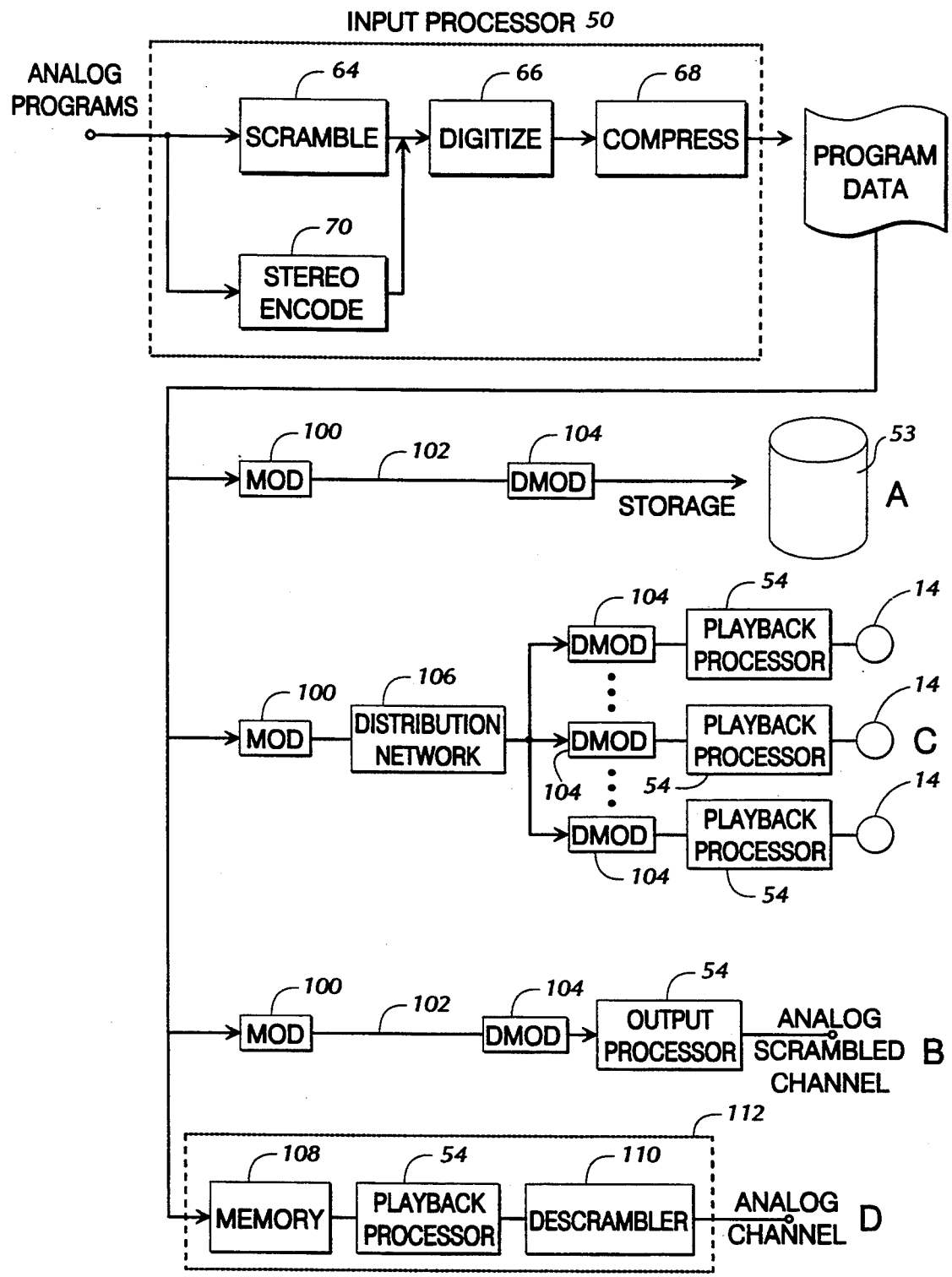
FIGS. 15 is a system block diagrams of alternate embodiments of the invention.

FIG. 14 illustrates an exemplary functional flow chart of the sync decompression algorithm. The process uses a pattern generation file to generate the sync for each line of the reconstructed signal. The pattern generation file comprises a number of digital amplitude levels which when output to a digital to analog converter will produce an analog representation of the HBI and sync pulse. The process is entered through Block A50 upon the clock related to the clock of D/A converter 308. If the process is within the time of an HBI, as determined in Block A54, then the appropriate data sample from the pattern generation file will be output. The program will then exit in Block A56 and wait for the next clock cycle and which time it will repeat outputting the time data samples of the pattern. The allows the sync synthesizer to always output a synchronizing portion for the video signal, even if for some reason the program data file does not contain a pair file describing the scrambled synchronizing information.

The decompression of the synchronizing information occurs in concert with this process during the active video portion of a horizontal line. This path is the negative branch from Block A52 where the process will determine if a new pair file has been received in Block A58. Assuming a new file has been received, it is tested against the previous pair file in Block A60 and, if not equal to the old file, tested in Block A62 to determine if its data is within prescribed limits. If there is no new file, the new file is equal to the previous pair file, or the new file is not within limits, then process exits in Block A64 to wit for a pair file which will pass these tests. When each test is passed, the previous file is replaced with the new pair file and its information decompressed in Blocks A66 and A68 by writing new amplitudes in the pattern generation file for each pair. The first pair (t=t0) is read and the stored level written into the pattern file for samples from t=t0 to t=t1. The process is repeated for all entries in the pair file until a new pattern file has been generated based on the compressed synchronizing information.

A similar routine is used for generating the descrambling pulses from the compressed decrambling information by the pulse synthesizer 315. A generalized pattern generation file is set up based upon a nominal levels in the decrambling window of the horizontal line. The pair file describing the actual descrambling pulse or pulses is then decompressed to fill data within that file. In the absence of a pair file within limits, the nominal level will be zero so that no pulse modulation (and no false descrambling information) is placed on the audio carrier.

With reference again to FIG. 13, the output of the sync synthesizer 314 is received by one of the inputs I0 of a digital multiplexer 306 whose other input I1 is provided from the MPEG decoder 304. The multiplexer 306 combines the decompressed active video digital information and the decompressed synchronizing digital information into a single data stream by switching from one input to the other in response to a digital timing signal whose frequency is related to the horizontal line rate and which is one state for the horizontal blanking interval and the other state for the active video portion of the signal. The reconstructed scrambled digital video signal is the converted to a scrambled analog video baseband signal by a digital to analog converter 308. The data recovery means 310 which receives the descrambling information of the program data file includes a pulse synthesizer for decompression and timing recovery of the descrambling pulses. The descrambling pulse or pulses are thereafter applied to an amplitude modulator 320 which amplitude modulates the pulses, in the correct time relation to the horizontal blanking interval, onto the audio carrier of the RF video signal. The audio carrier is then returned to the modulator 326 where it is combined with the video carrier to form the RF video channel signal.

The single or dual, mono or stereo, audio signals, are decompressed by decompressor 312 and thereafter converted to an analog signal. Either of the audio signals can be selected in response to a subscriber generated language choice signal which is part of the initial subscriber request. The output of the decompressor 312 is preferably an analog BTSC format audio signal at base band.

The modulator 318 amplitude modulates the video base band signal on a video carrier and, at a 4.5 MHz higher frequency, modulates the audio (stereo) base band signal on the sound carrier by frequency modulation. This produces an analog scrambled RF video signal which can be frequency division multiplexed into the channel line up of the subscriber system in the same manner as a scrambled channel of the scheduled programming.

FIGS. 15A–15D illustrate several additional embodiments of the digital record and playback system for a scrambled video signal and/or a stereo audio signal. The first alternative embodiment using the record processor 50, a digital communications link 102 and the file server memory 53 is labeled process A in the figure. The input processor 50 establishes program data files in the same manner described above, except that, before being stored in the file server memory 53, they are transmitted over the digital communications link 102. The digital link 102 is headed by a digital modulator 100 and terminated by a digital demodulator 104 which permits the transmission and reception of the program data file by any of the standard digital transmission schemes, for example, QAM or derivatives. The digital link 102 can be any communications link including, but not limited to, telephony, cable, fiber optic, satellite, UHF, VHF, etc. The addition of the digital link 102 to the system allows the input processor 50 to be remote form the file server memory 53 and still be able to provide updating information to the program library. For this embodiment it is within the scope of the invention to have several remote record processors 54 providing program library information through several digital communications links.

In another alternative embodiment, labeled B in the figure, the input processor 50 utilizing the digital modulator 100, the digital communications link 102, and the digital demodulator 104 can directly transmit program data to an output processor 54. In this manner, an analog scrambled channel is available for a variety of purposes at the output of the output processor 54. This type of system can be used to move scrambled analog programs between different points by digital transmission, for example, between headends of a cable system connected by a SONET ring or other digital link.

In still another alternative embodiment, labeled process C in the figure, a single point to multipoint distribution network 106 has been disposed between the digital modulator and a plurality of the digital demodulators 104. Each of the digital demodulators 104 feed an associated playback processor 54 and converter/descrambler 14. It is evident that such a subscriber system could provide the same services described for the system disclosed in FIGS. 1–4.

In yet still another alternative embodiment, labeled process D in the figure, a program data file may be stored in a memory 108 of a video processor 112. The video processor 112 includes a playback processor 54 which can convert the file to an analog signal and a descrambler which can convert the output of the playback processor to an analog channel signal. This type of video processor could be used on small processor systems to provide secure program files for playback.

While a preferred embodiments of the invention have been shown and described, it will be obvious to those skilled in the art that various modifications and alterations can be made thereto without departing from the spirit and scope of the invention as defined in the appended claims.

What is claimed is:

1. An apparatus for processing an analog video signal into a digital data stream comprising:
   means for scrambling the analog video signal into an analog scrambled video signal including an active video portion, synchronizing portions, and descrambling information;
   means for converting the active video portion of the scrambled video signal into digital samples;
   means for converting the synchronizing portions of the scrambled video signal into digital samples;
   means for converting the descrambling information into digital samples; and
   means for combining the digital active portions, said digital synchronizing portions and said digital descrambling information samples into a digital data stream.

2. An apparatus as set forth in claim 1 which further comprises:
   means for digitally compressing the active video samples.

3. An apparatus as set forth in claim 2 wherein:
   said means for digitally compressing said active video portion samples encodes the samples according to the MPEG algorithm to provide an MPEG data stream.

4. An apparatus as set forth in claim 1 which further includes:
   means for converting an analog audio signal into digital samples; and
   said means for combining combines said audio signal samples into said data stream.

5. An apparatus as set forth in claim 4 wherein:
   said analog audio signal is in BTSC stereo format.

6. An apparatus as set forth in claim 1 wherein said means for scrambling said video signal includes:
   means for modifying the levels, the duration of the levels or a combination of the levels and durations of the synchronizing portion of said video signal.

7. An apparatus as set forth in claim 1 wherein said means for scrambling said video signal includes:
   means for inverting at least a part of the active video portion of said video signal.

8. An apparatus as set forth in claim 1 wherein said means for scrambling said video signal includes:
   means for providing descrambling information apart from said scrambled video signal.

9. An apparatus as set forth in claim 1 wherein said means for scrambling said video signal includes:
   means for providing descrambling information as a part of said scrambled video signal.

10. An apparatus as set forth in claim 9 wherein said means for providing descrambling information includes:
    means for providing at least a part of said descrambling information as the levels, duration of levels or a combination of levels and durations of the synchronizing portion of said scrambled video signal.

11. An apparatus as set forth in claim 9 wherein said means for providing descrambling information includes:
means for providing at least a part of said descrambling information as the levels, duration of levels or a combination of levels and durations of pulses which are amplitude modulated on the sound carrier of said scrambled video signal.

12. An apparatus as set forth in claim 1 wherein:
at least one of said means for converting utilizes a different conversion rate than at least one of the others.

13. An apparatus as set forth in claim 1 which further comprises:
means for digitally compressing the active video samples;
means for digitally compressing the synchronizing samples; and
means for digitally compressing the descrambling information samples.

14. An apparatus as set forth in claim 13 wherein:
at least one of said means for compressing utilizes a different compression technique than at least one of the others.

15. An apparatus as set forth in claim 1 which further comprises:
means for digitally compressing the synchronizing samples.

16. An apparatus as set forth in claim 15 wherein said means for digitally compressing the synchronizing samples includes:
means for generating digital codes indicating the levels, the duration of the levels and combinations of the levels and the durations of said synchronizing samples.

17. An apparatus as set forth in claim 15 wherein said means for digitally compressing the synchronizing samples includes:
means for determining the type of analog scrambling used in said synchronizing samples; and
means for generating digital codes indicating the type of scrambling of said synchronizing samples.

18. An apparatus as set forth in claim 1 wherein said means for combining includes:
means for combining said digital samples into a program data file having at least a program identifier and a series of program data blocks.

19. An apparatus as set forth in claim 1 wherein said program data block includes at least:
video data blocks;
auxiliary data blocks; and
section identifiers for dividing said program data blocks into said active video data blocks and auxiliary data blocks.

20. An apparatus as set forth in claim 19 wherein said auxiliary data block includes at least one of:
synchronizing information data blocks;
descrambling information data blocks;
subsection identifiers for dividing said auxiliary data blocks into said synchronizing data blocks and descrambling data blocks.

21. An apparatus for processing a scrambled digital video signal having digital samples representing the active portion of an analog scrambled signal, the synchronizing portion of an analog scrambled signal and the scrambling information of an analog scrambled signal into a scrambled analog video signal comprising:
means for converting the digital samples representing the active video portion of the signal to an analog signal;
means for converting the digital samples representing the synchronizing portion of the video signal to an analog signal;
means for converting the digital samples representing the scrambling information to an analog signal; and
means for combining the analog signals of the active video portion, the synchronizing portion, and the scrambling information into the scrambled analog video signal.

22. An apparatus as set forth in claim 21 wherein the digital samples representing the active video portion of the signal have been digitally compressed, which further includes:
means for decompressing said digital samples.

23. An apparatus as set forth in claim 22 wherein:
said digital samples representing the active video portion of the signal have been compressed according to the MPEG algorithm and wherein said decompressing means is an MPEG decompressing means.

24. An apparatus as set forth in claim 21 wherein said scrambled digital video signal comprises digital samples representative of an audio signal which further includes:
means for converting said samples representing the audio signal into an analog signal; and
said means for combining said analog signals combines said audio analog signal with the other analog signals.

25. A system for processing and storing an analog video signal comprising:
means for scrambling the analog video signal into an analog scrambled video signal including active video portions, synchronizing portions, and descrambling information;
means for converting the active video portion of the scrambled video signal into digital samples;
means for converting the synchronizing portions of the scrambled video signal into digital samples;
means for converting the descrambling information into digital samples;
means for combining the digital active portions, said digital synchronizing portions and said digital descrambling information samples into a digital data stream;
means for storing the digital data stream in a memory;
means for reading the digital data stream from said memory;
means for converting the digital samples representing the active video portion of the signal to an analog signal;
means for converting the digital samples representing the synchronizing portion of the video signal to an analog signal;
means for converting the digital samples representing the scrambling information to an analog signal; and
means for combining the analog signals of the active video portion, the synchronizing portion, and the scrambling information into the scrambled analog video signal.

26. A system for processing and storing a scrambled analog video signal comprising:
means for digitizing a scrambled analog video signal into digital samples forming a digital data stream including an active video portion, synchronizing portion, and descrambling information;

means for storing the digital data stream in a memory;

means for reading the digital data stream from said memory;

means for convening the digital samples representing the active video portion, the synchronizing portion, and the scrambling information into the scrambled analog video signal.

27. A system for the transmission of program information, said system comprising:

a source of scrambled analog program information;

means for selectively digitizing said scrambled analog program information into program data;

means for transmitting said program data over a digital communications link;

means for receiving said program data; and means for converting said received program data into scrambled analog program information.

28. A system for the transmission of program information as set forth in claim 27, which further includes:

means for compressing said scrambled analog program information after it is digitized; and means for decompressing said program data after it is received.

29. A system for the transmission of program information as set forth in claim 28 wherein the scrambled analog program information has a scrambled video component and a stereo audio component and which further includes:

means for encoding the stereo audio component into a BTSC format signal before the scrambled analog program information is digitized; and said conversion means converts said received program data into scrambled analog program information with a BTSC format stereo audio component.

30. A system for the transmission of program information as set forth in claim 27 wherein the scrambled analog program information has a scrambled video component and a stereo audio component and which further includes:

means for encoding the stereo audio component into a BTSC format signal before the scrambled analog program information is digitized; and said conversion means converts said received program data into scrambled analog program information with a BTSC format stereo audio component.

31. A system for the transmission of program information, said system comprising:

a source of analog program information including a stereo audio component;

means for encoding said stereo audio component into a BTSC format signal;

means for selectively digitizing said analog program information into program data;

means for transmitting said program data over a digital communications link;

means for receiving said program data file; and means for converting said received program data into analog program information with a BTSC format stereo audio component.

32. A system for the transmission of program information as set forth in claim 31, which further includes:

means for compressing said analog program information after it is digitized; and means for decompressing said program data after it is received.

* * * * *